United States Patent
Li et al.

(10) Patent No.: US 10,520,380 B2
(45) Date of Patent: Dec. 31, 2019

(54) SMALL SIX-DIMENSIONAL FORCE AND TORQUE SENSOR

(71) Applicants: NANJING BIO-INSPIRED INTELLIGENT TECHNOLOGY CO., LTD., Nanjing (CN); NANJING LI-HANG INDUSTRY INSTITUTE OF BIONIC TECHNOLOGY LIMITED COMPANY, Nanjing (CN)

(72) Inventors: Chen Li, Nanjing (CN); Julu Yao, Nanjing (CN); Zhendong Dai, Nanjing (CN); Xiaofei Huang, Nanjing (CN)

(73) Assignees: NANJING BIO-INSPIRED INTELLIGENT TECHNOLOGY CO., LTD., Nanjing (CN); NANJING LI-HANG INDUSTRY INSTITUTE OF BIQNIC TECHNOLOGY LIMITED COMPANY, Nanjing (CN)

( * ) Notice: Subject to any disclaimer, the term of this patent is extended or adjusted under 35 U.S.C. 154(b) by 0 days.

(21) Appl. No.: 16/081,421

(22) PCT Filed: Apr. 13, 2017

(86) PCT No.: PCT/CN2017/080437
§ 371 (c)(1),
(2) Date: Aug. 31, 2018

(87) PCT Pub. No.: WO2017/215333
PCT Pub. Date: Dec. 21, 2017

(65) Prior Publication Data
US 2019/0271604 A1  Sep. 5, 2019

(30) Foreign Application Priority Data

Jun. 14, 2016 (CN) .......................... 2016 1 0428883

(51) Int. Cl.
*G01L 5/16* (2006.01)
*G01L 1/22* (2006.01)

(52) U.S. Cl.
CPC ............ *G01L 5/161* (2013.01); *G01L 1/2206* (2013.01)

(58) Field of Classification Search
CPC .............................. G01L 5/161; G01L 1/2206
See application file for complete search history.

(56) References Cited

U.S. PATENT DOCUMENTS 4,171,641 A * 10/1979 Landsness .......... G01M 17/022
73/146
4,448,083 A * 5/1984 Hayashi .................. G01L 5/161
73/862.042

(Continued)

FOREIGN PATENT DOCUMENTS

CN  101672705 A  3/2010
CN  103528726 A  1/2014

(Continued)

*Primary Examiner* — Jonathan M Dunlap
(74) *Attorney, Agent, or Firm* — Gokalp Bayramoglu

(57) ABSTRACT

A small six-dimensional force and torque sensor, includes a cylindrical housing, a base disposed on the inner wall of the cylindrical housing, eight first elastic beams of the same size and structure for connecting the base, a central boss disposed at the center of the cylindrical housing, four second elastic beams of the same size and structure for connecting the central boss with the first elastic beams. The four second elastic beams are arranged in a cross shape. The eight first elastic beams and the four second elastic beams are respectively attached with a plurality of strain gauges, thus forming full bridge circuits. The sensor is simple in structure, small in size, can realize self-decoupling of the structure in six directions, and is suitable to be used in combination with current industrial systems.

8 Claims, 3 Drawing Sheets

(56) References Cited

U.S. PATENT DOCUMENTS

| | | | | |
|---|---|---|---|---|
| 4,640,138 A * | 2/1987 | Meyer | G01L 5/226 | 73/862.044 |
| 4,672,855 A * | 6/1987 | Schmieder | G01L 5/161 | 73/862.041 |
| 4,821,582 A * | 4/1989 | Meyer | G01L 5/161 | 73/146 |
| 5,889,214 A * | 3/1999 | Kang | G01L 5/161 | 73/862.044 |
| 5,894,094 A * | 4/1999 | Kuchler | G01L 1/2262 | 73/146 |
| 5,969,268 A * | 10/1999 | Sommerfeld | G01L 1/2206 | 73/862.041 |
| 6,038,933 A * | 3/2000 | Meyer | G01L 1/2206 | 73/146 |
| 6,324,919 B1 * | 12/2001 | Larsen | G01L 1/2231 | 73/862.043 |
| 6,871,552 B2 * | 3/2005 | Liu | G01L 5/161 | 73/862.041 |
| 7,743,672 B2 * | 6/2010 | Kurtz | G01L 3/1457 | 73/862.041 |
| 8,161,827 B2 * | 4/2012 | Kato | G01L 3/1457 | 73/862.044 |
| 8,627,730 B2 * | 1/2014 | Valov | G01L 3/1457 | 73/862.044 |
| 9,448,128 B2 * | 9/2016 | Kim | G01L 5/161 | |
| 9,778,122 B2 * | 10/2017 | Meyer | G01L 5/168 | |
| 10,067,019 B2 * | 9/2018 | Bradford | B25J 13/085 | |
| 10,209,151 B2 * | 2/2019 | Okada | G01L 3/10 | |
| 2006/0037409 A1 * | 2/2006 | Ichige | G01L 1/2237 | 73/862 |
| 2009/0301217 A1 * | 12/2009 | Kurtz | G01L 3/1457 | 73/847 |
| 2010/0005907 A1 * | 1/2010 | Kato | G01L 3/1457 | 73/862.044 |

FOREIGN PATENT DOCUMENTS

| | | |
|---|---|---|
| CN | 103698076 A | 4/2014 |
| CN | 204346630 U | 5/2015 |
| CN | 106153237 A | 11/2016 |

* cited by examiner

SMALL SIX-DIMENSIONAL FORCE AND TORQUE SENSOR

CROSS REFERENCE TO RELATED APPLICATIONS

This application is the national phase entry of International Application No. PCT/CN2017/080437, filed on Apr. 13, 2017, which is based upon and claims priority to Chinese Patent Application No. 201610428883.5, filed on Jun. 14, 2016, the entire contents of which are incorporated herein by reference.

TECHNICAL FIELD

The present invention relates to the field of automation technology, and particularly to a small six-dimensional force and torque sensor.

BACKGROUND

A multi-dimensional force and torque sensor refers to a force sensor capable of measuring the force components or torque components in two or more directions simultaneously. In a Cartesian coordinate system, force and torque can be respectively decomposed into three components. Therefore, the most complete form of the multi-dimensional force is a six-dimensional force and torque sensor, i.e. a sensor capable of measuring three force components and three torque components simultaneously. Multi-dimensional force and torque sensors are widely used in the fields of robotics, industrial automation, military, etc.

A metal foil patch type six-dimensional force and torque sensor is widely used because of the characteristics like, it belongs to a matured technology, has excellent stability as compared to piezoelectric and semiconductor sensors, and has low requirements on the working environment, etc. However, the metal foil patch type six-dimensional sensor in the prior art has many defects:

Although the existing multi-dimensional force and torque sensor has a small sized elastomer and reduced volume, the number of strain gauges attached thereon are less. The force or torque in a certain direction or several directions needs to be calculated through the output of other directions and the size of the structure, which increases the system error.

The elastomer of the existing six-dimensional force and torque RSS sensor is formed by connecting all elastic beams together through ball hinges, which can meet the design requirements of self-decoupling, high precision, etc. However, the elastomer itself has high requirements for the assembly process, and the assembly accuracy thereof also affects the accuracy and decoupling of the elastomer. In addition, the natural frequency of such sensors is not very high.

Most of the existing non-coupled six-dimensional force and torque sensors achieve decoupling by assembly, which has high requirements for the assembly process.

SUMMARY

In view of the above, the present invention provides a small six-dimensional force and torque sensor, which enables self-decoupling of the structure in six directions, and has the characteristics of high strength, high rigidity, high natural frequency, ability to perform dynamic testing, high precision, and small structural size.

The present invention solves the above problems by the following technical means:

The small six-dimensional force and torque sensor of the present invention is characterized in that the small six-dimensional force and torque sensor includes a cylindrical housing, a base disposed on the inner wall of the cylindrical housing, eight first elastic beams of the same size and structure for connecting the base, a central boss disposed at the center of the cylindrical housing, four second elastic beams of the same size and structure for connecting the central boss and the first elastic beams, the four second elastic beams are arranged in a cross shape, the eight first elastic beams and the four second elastic beams are respectively attached with a plurality of strain gauges, thus forming full bridge circuits.

Preferably, the central boss is circular, and the middle of the circular central boss is provided with M2.5 first threaded hole and Φ1.5 pin hole for connecting and fixation.

Preferably, four first threaded holes and two pin holes are provided, and the four first threaded holes are distributed in a rectangular shape on the central boss, the two pin holes are respectively disposed on two sides of the four first threaded holes distributed in a rectangular shape.

Preferably, a top of the second elastic beam is higher than a top of the first elastic beam, and a bottom of the second elastic beam is lower than a bottom of the first elastic beam.

Preferably, each of the second elastic beams is vertically disposed on two first elastic beams connected thereto.

Preferably, an upper surface and a lower surface of the first elastic beam are the first patch areas for attaching the strain gauges.

Preferably, a center of the second elastic beam is provided with an interconnected groove along a height direction of the second elastic beam, and the interconnected groove is configured to increase the strain of a second patch area.

Preferably, one end of the second elastic beam connected with the first elastic beam is a second coordination area, and the outer flank of the second elastic beam where the interconnected groove is located is the second patch area for attaching the strain gauges, the second coordination area is used to increase the strain of the first patch area and the strength of the second elastic beam.

In the small six-dimensional force and torque sensor of the present invention, when the central boss is subjected to forces and torques, the base and the central boss are rigid and do not deform, the eight first elastic beams and four second elastic beams may all generate tension-compression deformation or bending deformation, thereby causing a change in the voltage signal outputted by each full bridge circuit. By analyzing and processing these signals, the force or torque in each direction is conveniently obtained. Therefore, the present invention is simple in structure, small in size, can realize self-decoupling of the structure in six directions, and is suitable to be used in combination with current industrial systems. Moreover, the cylindrical housing, the base, the central boss, the first elastic beam and the second elastic beam are integral components and no assembly is required, having the advantages of high strength, high rigidity, high natural frequency, desirable linearity, ideal repeatability and perfect hysteresis. In addition, the measurement range of the sensor can be arbitrarily changed by changing the dimensions of the first elastic beam and the second elastic beam.

BRIEF DESCRIPTION OF THE DRAWINGS

As shown in FIG. 1, cylindrical housing-1, base-2, central boss-3, first threaded hole-31, pin hole-32, first elastic beam-4, four second elastic beam-5, groove 51, second threaded hole-6, strain gauge-7.

As shown in FIG. 2, first elastic beam-401, first elastic beam-402, first elastic beam-403, first elastic beam-404, first elastic beam-405, first elastic beam-406, first elastic beam-407, first elastic beam-408.

As shown in FIG. 2, second elastic beam-501, second elastic beam-502, second elastic beam-503, second elastic beam-504.

DETAILED DESCRIPTION OF THE EMBODIMENTS

Figure 1:
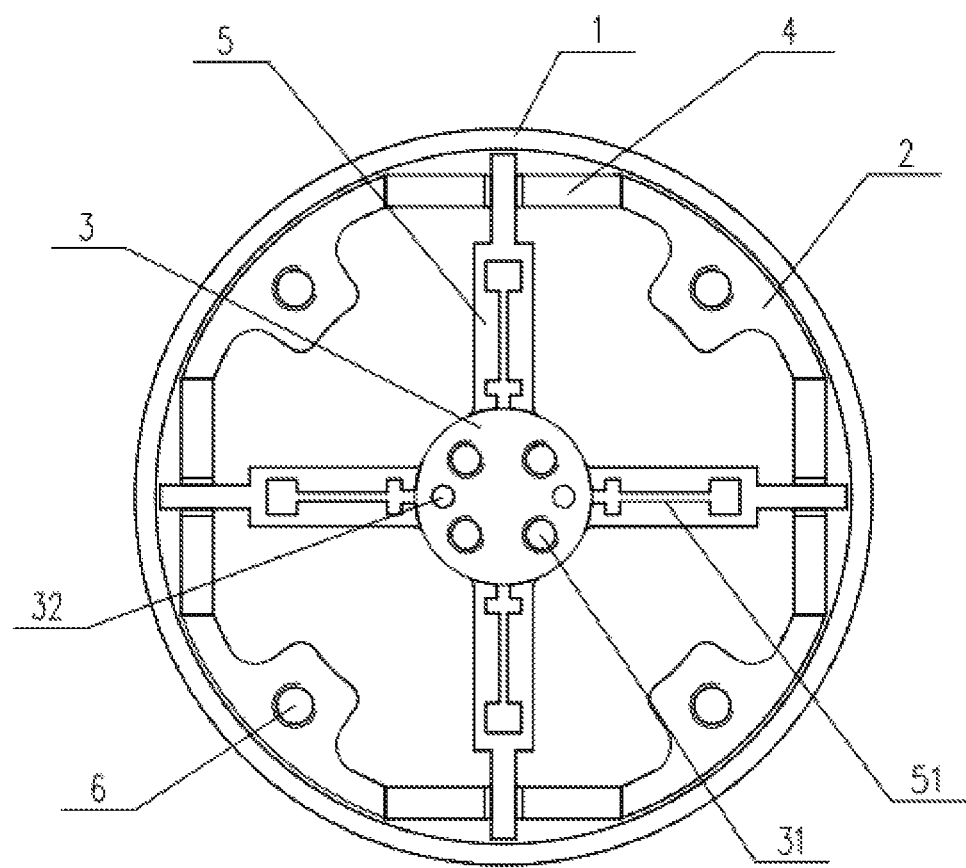
FIG. 1 is a structural schematic diagram of a small six-dimensional force and torque sensor of the present invention before being attached with a strain gauge.

In the description of the present invention, it should be understood that the terms such as "center", "upper", "lower", "front", "back", "left", "right", "vertical", "horizontal", "top", "bottom", "inside/internal", "outside/external", etc. indicating the locations or positional relationship are based on the locations or positional relationship shown in the drawings, which are merely used to facilitate and simplify the description of the present invention, rather than indicate or imply that the equipment or component referred to must have a specific orientation, or must be constructed and operated in a specific orientation, therefore these terms cannot be interpreted as limiting the presented invention.

The terms "first", "second" are merely used for the purpose of illustration and cannot be interpreted as indicating or implying relative importance, or as implicitly indicating the number of technical features indicated. Therefore, features limited by the terms "first", "second" can explicitly or implicitly include one or more of the features. In the description of the present invention, the meaning of "a plurality" is two or more unless otherwise specified.

The present invention will be described in detail below with reference to the drawings. As shown in FIG. 1, a small six-dimensional force and torque sensor of this embodiment includes cylindrical housing 1, base 2 disposed on the inner wall of the cylindrical housing 1, eight first elastic beams 4 of the same size and structure for connecting four bases 2 respectively, central boss 3 disposed at the center of the cylindrical housing 1, four second elastic beams 5 of the same size and structure for connecting the central boss 3 with the first elastic beams 4, the four second elastic beams 5 are arranged in a cross shape, the eight first elastic beams 4 and the four second elastic beams 5 are respectively attached with a plurality of strain gauges 7, thus forming full bridge circuits.

In the small six-dimensional force and torque sensor of this embodiment, when the central boss 3 is subjected to forces and torques, the base 2 and the central boss 3 are rigid and do not deform, the eight first elastic beams 4 and four second elastic beams 5 may all generate tension-compression deformation or bending deformation, thereby causing a change in the voltage signal outputted by each full bridge circuit. By analyzing and processing these signals, the force or torque in each direction is conveniently obtained. Therefore, the present invention is simple in structure, small in size, can realize self-decoupling of the structure in six directions, and is suitable to be used in combination with current industrial systems. Moreover, the cylindrical housing 1, the base 2, the central boss 3, the first elastic beam 4 and the second elastic beam 5 are integral components and no assembly is required, having the advantages of high strength, high rigidity, high natural frequency, desirable linearity, ideal repeatability and perfect hysteresis. In addition, the measurement range of the sensor can be arbitrarily changed by changing the dimensions of the first elastic beam 4 and the second elastic beam 5.

In this embodiment, the central boss 3 is circular, and the middle of the circular central boss 3 is provided with M2.5 first threaded hole 31 and Φ1.5 pin hole 32 for connecting and fixation. The first threaded hole 31 and the pin hole 32 can be closely matched with the connecting flange without a gap, and can realize dynamic measurement (such as reciprocating motion).

For ease of use, as a further improvement of the above technical solution, four first threaded holes 31 and two pin holes 32 are provided. The four first threaded holes 31 are distributed in a rectangular shape on the central boss 3, and the two pin holes 32 are respectively disposed on two sides of the four first threaded holes 31 distributed in a rectangular shape.

In this embodiment, each of four bases 2 is provided with a second threaded hole 6 for mounting a protective cover.

In order to improve the performance of the elastomer, as a further improvement of the above technical solution, the top of the second elastic beam 5 is higher than the top of the first elastic beam 4, and the bottom of the second elastic beam 5 is lower than the bottom of the first elastic beam 4.

In order to improve the performance of the elastomer, as a further improvement of the above technical solution, each of the second elastic beams 5 is vertically disposed on two first elastic beams 4 connected thereto, and the height of the first elastic beam 4 is ⅓ of the height of the second elastic beam 5.

Specifically, the upper surface and the lower surface of the first elastic beam 4 are the first patch areas for attaching the strain gauges 7.

In this embodiment, the center of the second elastic beam 5 is provided with an groove 51 along the height direction of the second elastic beam 5, and the groove 51 is configured to increase the strain of a second patch area.

In this embodiment, the groove 51 is provided with a rectangular groove as needed, and in general, the groove 51 has a Chinese character "±" type structure.

Specifically, one end of the second elastic beam 5 connecting with the first elastic beam 4 is a second coordination area, and the outer flank of the second elastic beam where the groove 51 is located is the second patch area for attaching the strain gauges. Moreover, the second patch area is specifically located on an outer flank of the segment with narrow wall thickness formed by the second elastic beam 5 and the groove 51, and the second coordination area is used to increase the strain of the first patch area and the strength of the second elastic beam 5.

Figure 2:
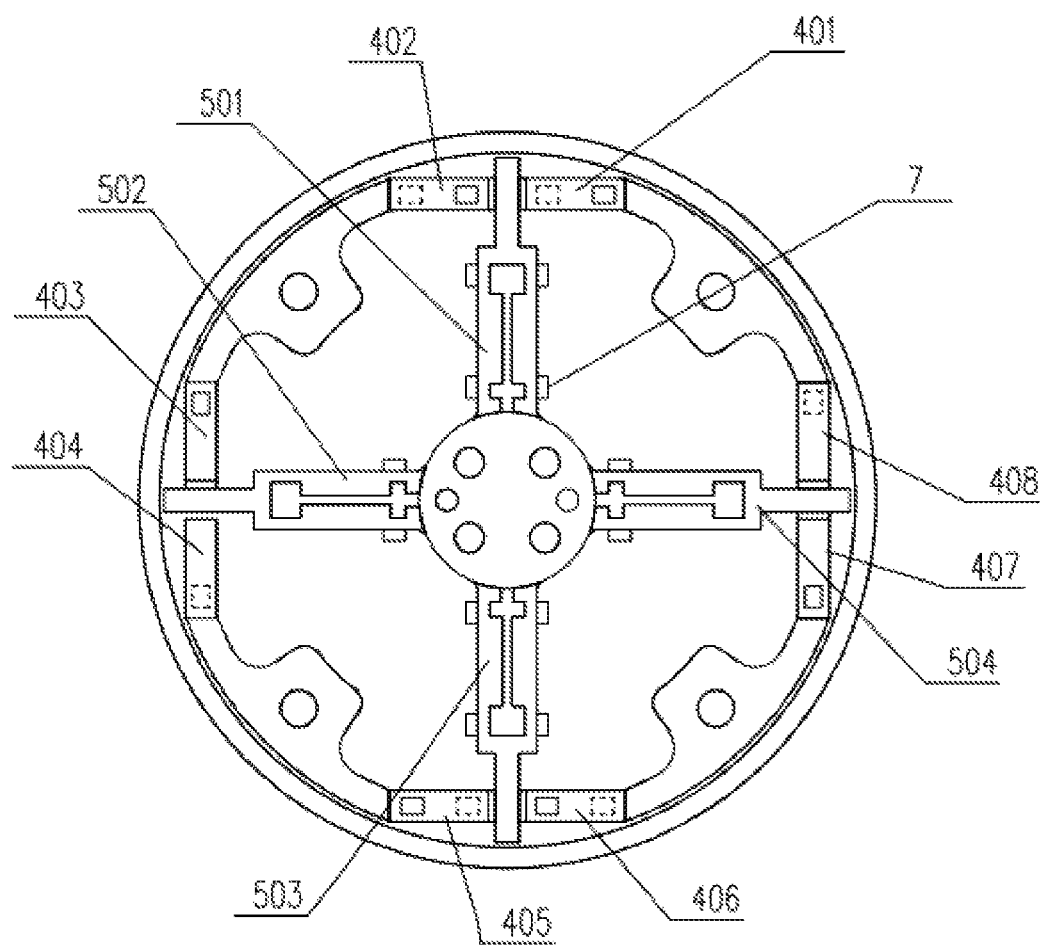
FIG. 2 is a structural schematic diagram of a small six-dimensional force and torque sensor of the present invention after being attached with a strain gauge.

As shown in FIG. 2, the eight first elastic beams 4 are respectively first elastic beam 401, first elastic beam 402, first elastic beam 403, first elastic beam 404, first elastic beam 405, first elastic beam 406, first elastic beam 407 and first elastic beam 408; the four second elastic beams 5 are respectively second elastic beam 501, second elastic beam 502, second elastic beam 503 and second elastic beam 504. The first elastic beam 401 and the first elastic beam 402 are symmetrically disposed with respect to the second elastic beam 501, the first elastic beam 403 and the first elastic beam 404 are symmetrically disposed with respect to the second elastic beam 502, the first elastic beam 405 and the first elastic beam 406 are symmetrically disposed with respect to the second elastic beam 503, and the first elastic beam 407 and the first elastic beam 408 are symmetrically disposed with respect to the second elastic beam 504.

Figure 3:
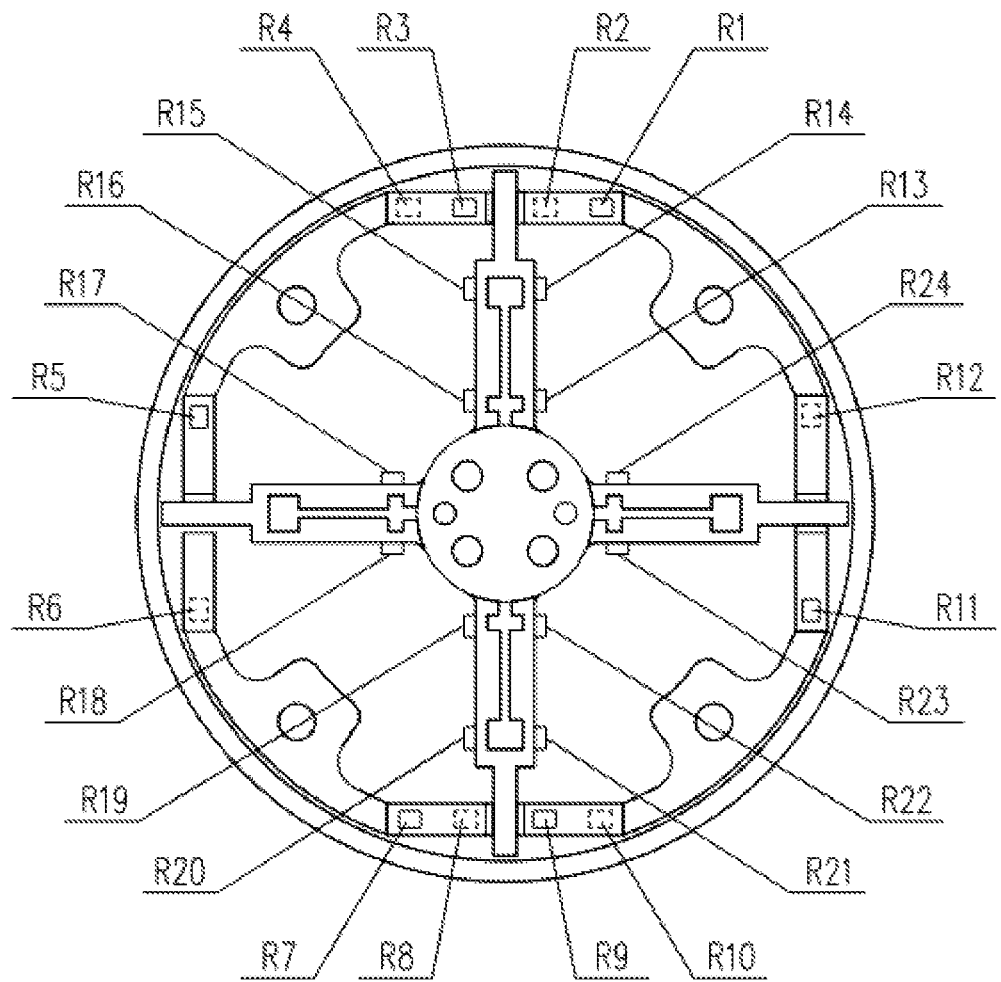
FIG. 3 is a schematic diagram of a distribution of strain gauges of a small six-dimensional force and torque sensor of the present invention.

A plurality of the strain gauges 7 are respectively represented by Rn (n=1, 2, 3, 4, ... ), then:

As shown in FIG. 2 and FIG. 3, R1 is disposed at an end of the upper surface of the first elastic beam 401 near the base 2, R2 is disposed at an end of the lower surface of the first elastic beam 401 near the second elastic beam 501, R3 is disposed at an end of the upper surface of the first elastic beam 402 near the second elastic beam 501, R4 is disposed at an end of the lower surface of the first elastic beam 402 near the base 2, R5 is disposed at an end of the upper surface of the first elastic beam 403 near the base 2, R6 is disposed at an end of the lower surface of the first elastic beam 404 near the base 2, R7 is disposed at an end of the upper surface of the first elastic beam 405 near the base 2, R8 is disposed at an end of the lower surface of the first elastic beam 405 near the second elastic beam 503, R9 is disposed at an end of the upper surface of the first elastic beam 406 near the second elastic beam 503, R10 is disposed at an end of the lower surface of the first elastic beam 406 near the base 2, R11 is disposed at an end of the upper surface of the first elastic beam 407 near the base 2, and R12 is disposed at an end of the lower surface of the first elastic beam 408 near the base 2.

Moreover, R13 and R16 are symmetrically disposed with respect to the center line of the second elastic beam 501. R14 and R15 are symmetrically disposed with respect to the center line of the second elastic beam 501. R17 and R18 are symmetrically disposed with respect to the center line of the second elastic beam 502. R19 and R22 are symmetrically disposed with respect to the center line of the second elastic beam 503. R20 and R21 are symmetrically disposed with respect to the center line of the second elastic beam 503. R23 and R24 are symmetrically disposed with respect to the center line of the second elastic beam 504.

Finally, it should be noted that the above embodiments are merely used to illustrate the technical solutions of the present invention rather than limit it. Although the present invention has been described in detail with reference to the preferred embodiments, it should be understood by those of ordinary skill in the art that the technical solutions of the present invention can be modified or equivalently substituted without departing from the spirit and scope of the technical solutions of the present invention, which should be included within the scope of the claims of the present invention.

What is claimed is:

1. A six-dimensional force and torque sensor, comprising a cylindrical housing, a base disposed on an inner wall of the cylindrical housing, eight first elastic beams of a first same size and structure for connecting the base, a central boss disposed at a center of the cylindrical housing, four second elastic beams of a second same size and structure for connecting the central boss with the first elastic beams; the four second elastic beams are arranged in a cross shape, the eight first elastic beams and the four second elastic beams are respectively attached with a plurality of strain gauges to form full bridge circuits, a center of each of the second elastic beams is provided with an interconnected groove along the second elastic beams height direction.

2. The six-dimensional force and torque sensor according to claim 1, wherein the central boss is a circular central boss, and a center of the circular central boss is provided with a M2.5 first threaded hole and a $\Phi 1.5$ pin hole for connecting and fixation.

3. The six-dimensional force and torque sensor according to claim 2, wherein four first threaded holes and two pin holes are provided; the four first threaded hole are distributed in a rectangular shape on the central boss, and the two pin holes are respectively disposed on two sides of the four first threaded holes distributed in a rectangular shape.

4. The six-dimensional force and torque sensor according to claim 1, wherein a top of each of the second elastic beams is higher than a top of each of the first elastic beams, and a bottom of each of the second elastic beams is lower than a bottom of each of the first elastic beams.

5. The six-dimensional force and torque sensor according to claim 4, wherein each of the second elastic beams is vertically disposed on two first elastic beams connected thereto.

6. The six-dimensional force and torque sensor according to claim 1, wherein each of the second elastic beams is vertically disposed on two first elastic beams connected thereto.

7. The six-dimensional force and torque sensor according to claim 1, wherein an upper surface and a lower surface of each of the first elastic beams are first patch areas for attaching the strain gauges.

8. The six-dimensional force and torque sensor according to claim 7, wherein one end of each of the second elastic beams connecting with each of the first elastic beams is a coordination area, an outer flank of each of the second elastic beams is a second patch area for attaching the strain gauges, and the interconnected groove is located on each of the second elastic beams, the coordination area is used to increase a strain of the first patch area and a strength of each of the second elastic beams.

* * * * *